Patented Oct. 5, 1926.

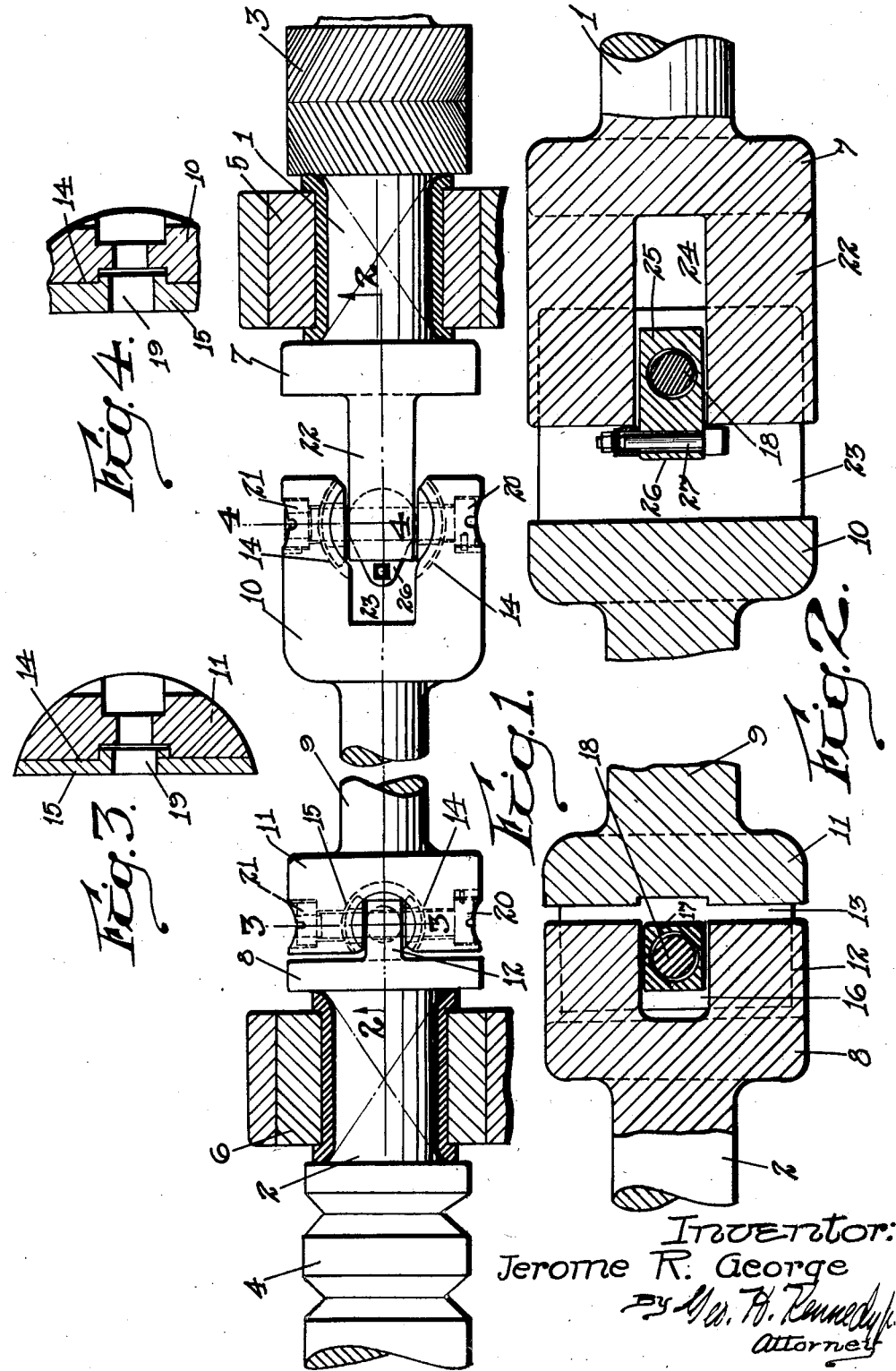

1,601,958

UNITED STATES PATENT OFFICE.

JEROME R. GEORGE, OF WORCESTER, MASSACHUSETTS, ASSIGNOR TO MORGAN CONSTRUCTION COMPANY, A CORPORATION OF MASSACHUSETTS.

UNIVERSAL COUPLING.

Application filed July 7, 1923. Serial No. 650,138.

The present invention relates to universal couplings for shafting and the like, being particularly designed for the connection of roll shafts and pinion shafts in a rolling mill,—although equally well adapted for general use in connecting any rotative members that are subject to disalignment.

An object of the invention is to provide a universal coupling which will perform its functions, in all positions of adjustment of the connected parts, without binding or undue strain, and more particularly to provide a coupling of this character which can be readily and easily engaged and disengaged, by simple endwise movement, to permit removal and replacement of the driven member. The above and other objects are attained by the construction hereinafter described, reference being had to the accompanying drawings, in which—

Fig. 1 is a view in side elevation, partly in section, showing my invention as applied to the connection of the pinion and roll shafts of a rolling mill.

Fig. 2 is an enlarged sectional view on the line 2—2 of Fig. 1.

Fig. 3 is a similar sectional view on the line 3—3 of Fig. 1.

Fig. 4 is a similar sectional view on the line 4—4 of Fig. 1.

Like reference characters refer to like parts in the different figures.

In the drawings, the numerals 1 and 2 designate, respectively, the driving and driven members to be coupled, the former being illustrated as the shaft of a driving pinion 3, and the latter as the neck or gudgeon of a roll 4,—said parts being suitably journalled in the pinion and roll housings 5 and 6, respectively, of a rolling mill. The opposing ends of the members 1 and 2 are provided with enlarged portions 7 and 8, respectively, and the coupling spindle 9 between said members has complementary enlargements 10 and 11, the former for universal connection with the enlargement 7 and the latter for universal connection with the enlargement 8.

The universal joint between the enlargements 8 and 11 is of a type somewhat similar to the connections heretofore employed in devices of this class, and involves a tongue and slot connection between the parts; as here shown, the enlargement 8 provides a tongue 12 and the enlargement 11 provides a slot 13, but, obviously, this arrangement could be reversed. In either arrangement, the opposite side walls of the slot 13 are formed with concave bearing surfaces 14, 14 for the reception of a pair of bearing members 15, 15 having convex outer surfaces and flat inner surfaces, the latter being opposed to the flat sides of the tongue 12. Said tongue 12 itself provides a central slot 16, at right angles to the slot 13 and adapted to receive a cylindrical block 17. The latter is diametrically apertured for the passage of a through bolt 18, which extends transversely of the slot 13 and passes loosely through enlarged openings 19, 19 of bearing members 15, 15, with its head 20 and nut 21 preferably disposed in countersunk recesses of the side portions of enlargement 11.

As will be well understood, the construction above described permits of limited universal action between the roll spindle 2 and the coupling spindle 9, by reason of the bearing members 15, 15 being free to oscillate about an axis extending at right angles to the axis of pivotal bolt 18. It is, of course, to be understood that a similar flexible connection is provided at the other end of the coupling spindle 9, in the form of a universal joint between the enlargements 7 and 10,—this allowing the coupling spindle 9 to shift axially and to assume any necessary position of angularity in transmitting the drive of the pinion shaft 1 to the roll spindle 2. Heretofore, both connections at opposite ends of the coupling spindle have been made identical, one being the counterpart of the other. With a universal mill of this construction, great difficulty is experienced whenever it becomes necessary to lift a roll out of the housing, for purposes of replacement or repair, since it is necessary, after disconnecting the coupling spindle from the roll or rolls to swing said spindle upwardly into a position where it will not interfere with the desired movement of the roll or rolls.

According to the present invention, the difficulties above set forth are overcome by the construction shown at the right hand side of Figures 1 and 2, where provision is made, in the tongue and slot connection between the enlargements 7 and 10, for endwise or axial movement of the coupling member relative to the driving and driven devices which it normally connects, whenever it is desired to free said driven device.

As here shown, said connection is constituted by a tongue 22 on enlargement 7 which is received within a slot 23 of enlargement 10, but obviously, this arrangement could be reversed; whatever the arrangement, it is essential, for the purposes of the invention, that both the tongue 22 and the slot 23 be axially elongated, so that when the parts are connected up in normal operative relation, as shown in Figs. 1 and 2, there is still opportunity for considerable further telescopic movement between them before the tongue finally bottoms in the slot.

As regards the bearing surfaces 14, 14, bearing members 15, 15 and bolt 18, the connection between the enlargements 7 and 10 is identical with the connection between the enlargements 8 and 11. However, the tongue slot 24 which receives block 25 is elongated, in conformity with the extra length of tongue 22, and in addition, said block 25 has a portion 26 extending beyond the end of tongue 22 into the space between the end of said tongue and the bottom of slot 23. Said projection 26 is apertured for the passage of a bolt 27, the projecting ends of which operate as stops or abutments against the end of tongue 22 to prevent telescopic movement of the enlargements 7 and 10.

Whenever it is desired to free the roll 4, so as to permit it to be lifted bodily out of its housing, it is only necessary to remove the bolt 27 from the block 25; this allows the coupling spindle 9 and its connected parts to be shifted axially to the right, by reason of the telescopic action between the enlargements 7 and 10, and thus carries the parts at the other end of said coupling spindle entirely away from the roll 4. When a roll is put back in place, it is only necessary to shift the coupling spindle 9 to the left, and to replace the bolt 27, in order to establish the universal driving connection between said roll and the pinion shaft 1. It will thus be seen that I have provided a universal mill coupling adapted to be engaged and disengaged by a simple endwise movement, and furthermore, that no dismantling or reassembling of the universal joint connections is made necessary by the operation of changing a roll or rolls.

I claim:—

1. The combination with driving and driven elements, of an interposed coupling member adapted to couple said elements together for rotation in unison, said coupling member, at opposite ends, making a universal connection with each of said elements, the universal connection with one of said elements being telescopic to permit endwise movement of said coupling element for disengagement of its other end from the other element, and a bolt removably carried by said coupling member, inwardly of the element with which said telescopic connection is made, for normally preventing said endwise movement, the removal of said bolt permitting said endwise movement.

2. The combination with driving and driven elements, of an interposed member adapted to couple said elements together for rotation in unison, said coupling member, at opposite ends, making a universal connection with each of said elements, one of said universal connections including a block carried by said coupling member and slidable axially in the associated element to permit endwise disengaging movement of said coupling member from the other element, and means removably carried by said block, inwardly of its associated element, for normally preventing said endwise movement.

3. A universal coupling between driving and driven elements, comprising tongue and slot connections with each of said elements, each connection providing bearing shoes and an interposed spacing block assembled in each slotted portion by a pivot bolt therethrough, one of said connections having its slot elongated, with a corresponding elongation of the block-receiving slot in the tongue, to permit endwise movement of said coupling, and means carried by the block to limit said endwise movement in the operative relation of the parts.

4. A universal coupling between driving and driven elements, comprising tongue and slot connections with each of said elements, which connections provide bearing shoes and an interposed spacing block therein, means providing for endwise movement in one of said connections to permit disconnection from the driven element, and a pin removably carried by said spacing block to prevent said endwise movement in the operative relation of the parts.

Dated this 27th day of June, 1923.

JEROME R. GEORGE.